Figures 1, 2, 3:
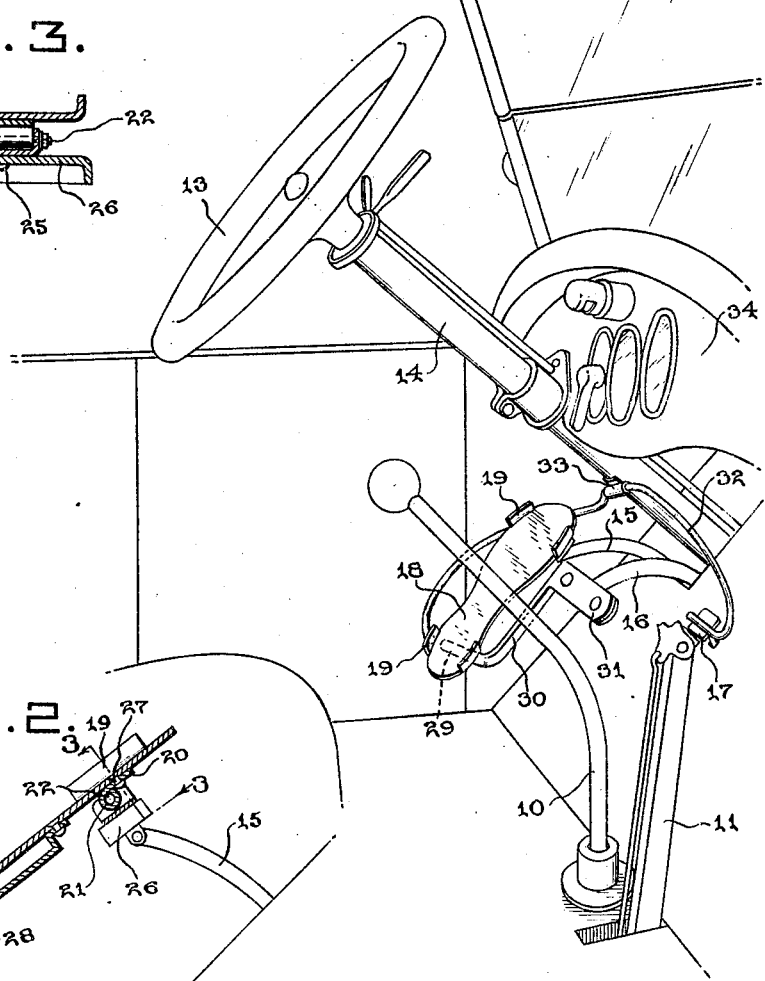

May 18, 1926.  1,584,712
A. L. BAILEY ET AL
SINGLE FOOT PEDAL FOR AUTOMOBILES
Filed Oct. 12, 1925

WITNESSES
H. A. LaClair

Ainsworth L. Bailey
Rudolph R. Gatzke
INVENTORS

BY
ATTORNEYS

Patented May 18, 1926.

1,584,712

UNITED STATES PATENT OFFICE.

AINSWORTH L. BAILEY AND RUDOLPH R. GATZKE, OF BUTTE, MONTANA.

SINGLE FOOT PEDAL FOR AUTOMOBILES.

Application filed October 12, 1925. Serial No. 62,153.

This invention relates generally to automobiles and more particularly to automobiles of that nature controlled in use through separate clutch and brake arms and an accelerator pedal. In such automobiles the clutch arm with its pedal is usually at the left for control and actuation by the left foot, while the brake arm and its pedal are at the right adjacent to the accelerator and pedal for control and actuation by the right foot, the foot being shifted from the brake pedal to the accelerator pedal and vise versa in the operation of the machine.

The particular object of our present invention is the provision of a single foot control for the clutch and brake arms as well as for the accelerator with the purpose in view of permitting effective control of the machine by an operator having but a single limb.

In the accompanying drawing which illustrates our present invention and forms a part of the specification, Figure 1 is a perspective view illustrating particularly the application of our invention, Figure 2 is a detail vertical longitudinal section through the single foot control pedal of our invention, and Figure 3 is a detail cross section taken substantially on lines 3—3 of Figure 2.

Referring now to these figures and particularly to Figure 1, we have shown certain parts of the control mechanism of an automobile including the usual gear shift 10, emergency brake 11, steering wheel 13, steering post 14, clutch arm 15, foot brake arm 16, and accelerator 17.

Our invention has in particular to do with a control of the clutch and brake arms 15 and 16 and the accelerator 17 by means of a single member in order to permit of ready and effective control by an operator having but a single limb.

It is for the above purposes that our invention proposes a foot pedal 18 of substantial sizes in order to firmly and fully receive the foot of the operator, such pedal having upright side pieces 19 adjacent to the toe and heel portions thereof in order to obviate the danger of side slipping of the foot off of the pedal.

In the present instance we have shown the pedal 18 of our invention directly attached to the clutch actuating control arm 15, the toe portion of the pedal 18 having there beneath a pivoted piece 20 as plainly seen by a compression in Figures 2 and 3 provided with a transversely disposed tubular bearing 21.

This bearing receives a transverse bolt 22, the latter passing through the upright sides 23 of a bracket 24 and rigidly secured as by means of rivets or the like 25, to the usual foot piece 26 of the clutch arm 15, or to some other member pivotally attached like the usual foot piece to this arm.

In this way the forward or toe portion of the single control pedal proposed by our invention is not only mounted to swing vertically so that its heel portion may be raised and lowered, but is adapted for the actuation of the clutch arm 15 by direct pressure downwardly on the toe portion of the pedal, and is still further adapted to swing laterally upon a pivot formed by the single rivet movably joining the pedal with the bearing piece 20, this single rivet being indicated at 27.

Along the under side of its rear portion the pedal 18 has a guide bracket 28, best seen in Figure 2, and through the space between the pedal and the guide bracket 28 extends one angular end 29 of an approximately Z-shaped attaching bracket 30 whose other angular arm 31 is securely fastened to the upper end of the brake actuating arm 16. Thus by pressing downwardly upon the heel portion of the control pedal 18 the forward portion thereof flexing upon the pivot bolt 22, the foot brakes may be controlled and actuated.

In order that the pedal 18 may also control depression of the accelerator 17 a rod 32 is mounted intermediate its ends through a bearing bracket 33 in which it may turn, this bearing bracket being pivotally attached to the steering post 14, although it may be mounted in connection with the dash or instrument board 34. One end of the rod 32 extends downwardly and is curved immediately over the accelerator 17, while the opposite end projects along one side of the foot pedal 18 and has it extremity 35 bent downwardly at one side of the heel portion of the pedal.

Thus by swinging the pedal laterally upon its forward rivet 27 it is obvious that the adjacent end 35 of the rod 32 will be engaged with the result that the rod will be turned in its bearing 33 and its other end will engage and force the accelerator 17 downwardly.

In this way our invention not only provides a simple, inexpensive apparatus adapted to effectively and efficiently carry out the objects first above stated with respect to the control of the machine from a single control pedal, but our invention also proposes an apparatus capable of ready, easy application with but slight difference in shapes and sizes to all automobiles having separate clutch and brake pedals normally controlled by two feet and an accelerator usually depressed by the same foot employed in the application of the foot brakes.

Moreover our invention provides an arrangement and construction by virtue of which the single foot control pedal may be applied directly to either the clutch pedal on the left, or the brake pedal on the right, whereby it may be moved with equal facility by those who have suffered the loss of the right limb, and those who have suffered the loss of the left limb.

We claim:—

1. A singular control for automobile clutch and brake arms and the foot accelerators thereof, comprising a foot pedal pivotally connected to one of said arms for the actuation of the latter by direct pressure and for swinging movements both vertically and horizontally, a movable connection between said pedal and the other arm whereby to actuate the latter by vertical pivotal movement of the pedal, and accelerator actuating means adjacent to and engageable by the pedal during lateral swinging movement of the latter as described.

2. A single foot control for automobile clutch and brake arms and the accelerators thereof, consisting of a lateral and vertical swingable foot pedal attached to one of said arms and arranged to actuate the latter upon direct pressure upon the foot pedal, connections between the other arm and the said pedal actuated by the latter during its swinging movement in one direction and connections between the accelerator and the said foot pedal and actuated by the latter during swinging movements in the other direction.

3. A single foot control for automobile clutch and brake arms and the accelerators thereof, comprising a single control member in connection with one of said arms and tiltable and swingable with respect thereto, connections between the other arm and the control member actuated by the latter during its tilting movement, and connections between the accelerator and the control member actuated by the latter during its swinging movement.

4. A single foot control for automobile clutch and brake arms consisting of a pedal member whose forward portion is in swingable connection with one of said arms, and a bracket attached to the other arm and extending beneath the rear portion of said pedal.

AINSWORTH L. BAILEY.
RUDOLPH R. GATZKE.